United States Patent [19]

Kosako

[11] Patent Number: 6,081,669
[45] Date of Patent: Jun. 27, 2000

[54] PHOTOMETRIC OPERATION SYSTEM OF CAMERA

[75] Inventor: Kosei Kosako, Tokyo, Japan

[73] Assignee: Asahi Kogaku Kogyo Kabushiki Kaisha, Tokyo, Japan

[21] Appl. No.: 08/970,525

[22] Filed: Nov. 14, 1997

[30] Foreign Application Priority Data

Nov. 15, 1996 [JP] Japan ................................. 8-305200

[51] Int. Cl.⁷ ........................................... G03B 15/02
[52] U.S. Cl. ........................... 396/61; 396/63; 396/233; 396/234
[58] Field of Search ........................... 396/61, 63, 233, 396/234

[56] References Cited

U.S. PATENT DOCUMENTS

| | | |
|---|---|---|
| 4,912,495 | 3/1990 | Ishikawa et al. ........................ 396/63 |
| 5,021,818 | 6/1991 | Satoh et al. . |
| 5,023,649 | 6/1991 | Hayashi et al. ........................ 396/63 |
| 5,146,258 | 9/1992 | Bell et al. ............................. 396/234 |
| 5,289,225 | 2/1994 | Hirai . |
| 5,471,276 | 11/1995 | Hirai et al. . |
| 5,748,996 | 5/1998 | Lee ........................................ 396/63 |
| 5,815,743 | 9/1998 | Ohmori .................................. 396/61 |

*Primary Examiner*—Russell Adams
*Attorney, Agent, or Firm*—Greenblum & Bernstein, P.L.C.

[57] ABSTRACT

A photometric operation system of a camera includes a photographing lens with a variable focal length. A plurality of photometering devices independently receive and detect rays of object light within a plurality of photometering areas of different sizes. A calculator determines the brightness of an object in accordance with the photometric data supplied from the photometering devices. A smaller photometering area is contained in the larger photometering area. The photometric data is weighted in accordance with the focal length of the photographing lens in the calculation of the object brightness by the calculator devices.

14 Claims, 4 Drawing Sheets

PHOTOMETRIC OPERATION SYSTEM OF CAMERA

BACKGROUND OF THE INVENTION

1. Field of the Invention

The present invention relates to a photometric operation system of a camera in which photometering and calculating operations can be carried out for a plurality of object areas (focusing areas).

2. Description of the Related Art

In a camera having a zoom lens or multi-focus lens as, such a photographing lens, in which the brightness (luminance) of an object to be photographed is measured by a photometering optical system separate from the photographing lens, without passing through the photographing lens, if the focal length of the photographing lens changes, no change in the light receiving area occurs. To measure the brightness of the object within an object area corresponding to the focal length of the photographing lens, i.e., the photographing range, it is known to measure the brightness of objects within object areas of different sizes.

However, split photometering elements for a plurality of split photometering areas are complicated, thus resulting in a complex calculating operation. Moreover, in a photometering system having two photometering areas in conventional cameras, a spot metering mode or an averaged overall light reading mode can be selected, but the same photometering operation is carried out regardless of the focal length, i.e., it is impossible to vary the photometric distribution in accordance with the focal length.

It is an object of the present invention to provide a photometric operation system of a camera having a photographing lens having a variable focal length, such as a zoom lens and a photometering mechanism in which photometric data can be obtained from a plurality of photometering zones (focusing zones), and appropriate photometric data corresponding to the focal length can be obtained.

SUMMARY OF THE INVENTION

To achieve the object mentioned above, according to an aspect of the present invention, there is provided a photometric operation system of a camera comprising a photographing lens whose focal length is variable. A plurality of photometering units independently receive and detect rays of object light within a plurality of photometering areas of different sizes. A calculation mechanism calculates the brightness of an object in accordance with the photometric data supplied from the photometering units. A smaller photometering area is contained in a larger photometering area, and wherein the photometric data is weighed in accordance with the focal length of the photographing lens in the calculation of the object brightness by the photometers units.

According to another aspect of the present invention, there is provided a photometric operation system of a camera comprising. A photographing lens has a focal length which variable. A first photometering unit meters a first object area. A second photometering unit meters a second smaller object area contained in the first object area. A calculation device calculates the object brightness or exposure value in accordance with the photometric data supplied from the first and second photometering unit. The calculation device uses a predetermined calculation expression in which first and second photometric data of the first and second photometering means are weighed in accordance with the focal length of the photographing lens.

In an embodiment, the object brightness Bv is calculated using the following expression:

$$Bv = K1 \times (fx-W)/(T-W) \times BN + (1-K1 \times (fx-W)/(T-W)) \times Bw;$$

wherein

Bv represents an object brightness obtained by the calculation;

K1 represents a coefficient which satisfies $(0 < K1 \leq 1)$;

Bw represents an object brightness obtained using the photometric value of the first photometering means;

BN represents an object brightness obtained using the photometric value of the second photometering means;

T represents a longest focal length (telephoto extremity);

W represents a shortest focal length (wide angle extremity);

fx represents a current focal length.

In another embodiment, the object brightness Bv can be calculated using one of the following equations:

$$Bv = (1 - K2 \times (T-fx)/(T-W)) \times BN + K2 \times (T-fx)/(T-W) \times Bw;$$

wherein

K2 represents a coefficient which satisfies $0 < K2 \leq 1$.

$$Bv = K1 \times ((fx-W)/(T-W))^2 \times BN + (1 - K1 \times ((fx-W)/(T-W)^2) \times Bw;$$

K1 represents a coefficient which satisfies $0 < K1 \leq 1$.

$$Bv = K1 \times ((fx-W))/(T-W)^{1/2} \times BN + (1 - K1 \times ((fx-W)/(T-W))^{1/2}) \times Bw.$$

K1 represents a coefficient which satisfies $0 < K1 \leq 1$.

In another embodiment, the object brightness Bv is calculated using the following equations in a first area from the shortest focal length W to an intermediate focal length M and in a second area from the intermediate focal length M to a longest focal length T, respectively:

$$Bv = K1 \times ((fx-W)/(M-W))^2 \times BN + (1 - K1 \times ((fx-W)/(M-W))^2) \times Bw;$$

$$Bv = K2 \times ((fx-M)/(T-M))^{1/2} \times BN + (1 - K2 \times ((fx-M)/(T-M))^{1/2}) \times Bw.$$

wherein

K2 represents a coefficient which satisfies $0 < K2 \leq 1$.

The coefficients K1 and K2 are independently empirically determined.

The present disclosure relates to subject matter contained in Japanese patent application No. 08-305200 (filed on Nov. 15, 1996) which is expressly incorporated herein by reference in its entirety.

BRIEF DESCRIPTION OF THE INVENTION

The invention will be described below in detail with reference to the accompanying drawings, in which.

DESCRIPTION OF THE PREFERRED EMBODIMENT

Figure 1:
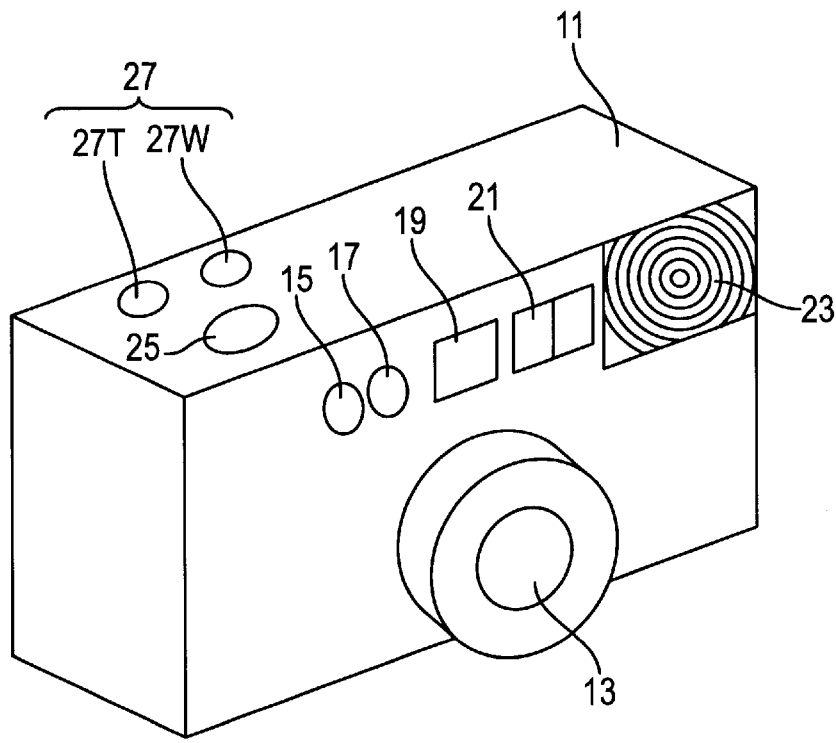
FIG. 1 is a perspective view of a zoom lens shutter camera having a photometric operation system according to the present invention.

FIG. 1 shows a perspective view of an example of a lens shutter type of zoom lens camera to which the present invention is applied. A camera body 11 is provided on the front surface thereof with a zoom lens 13. The camera body 11 is also provided, above the zoom lens 13, with a first photometering window 15, a second photometering window 17, a finder 19, a focusing window 21 and a strobe light emission window (Fresnel lens) 23, in this order from the left. The camera body is provided on the upper surface thereof with a release button 25 and a zoom button 27 (TELE button 27T and WIDE button 27W). The present invention can be used with an Advanced Photo System camera).

Figure 2:
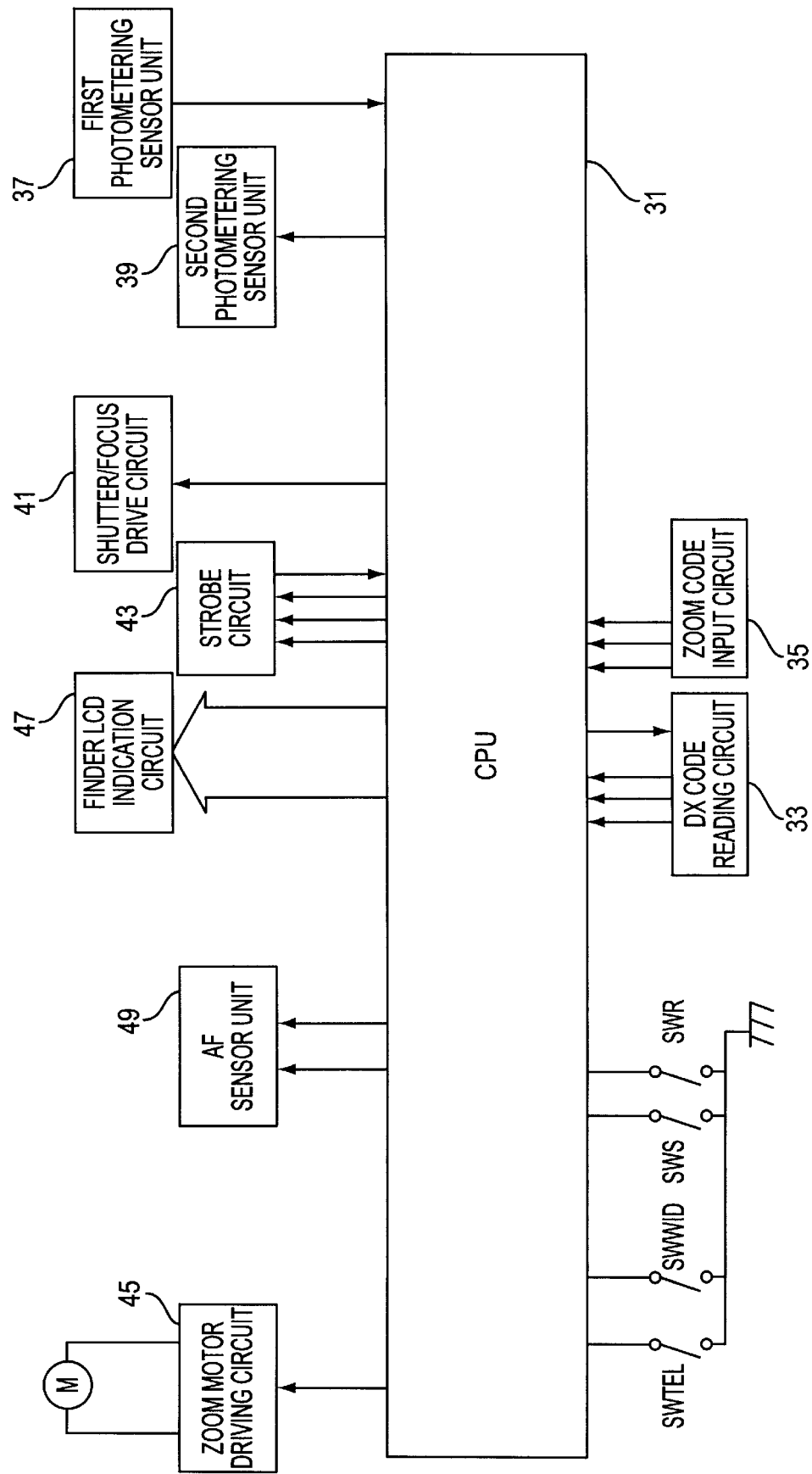
FIG. 2 is a block diagram of a circuitry of the camera shown in FIG. 1.

FIG. 2 shows a block diagram of a control system including a photometering circuit, a focusing circuit, and an exposure circuit, etc. The camera body includes a CPU (microcomputer) 31 which performs the general management of the various operations of the camera including a photometering operation, an automatic focusing (AF) operation, an automatic exposure operation, a film winding and rewinding operation, etc. To the CPU 31 are connected a photometering switch SWS which is turned ON when the release button 25 is depressed by half a step, a release switch SWR which is turned ON when the release switch is fully depressed, a tele-zoom switch SWTEL which is associated with the zoom button 27 and which is turned ON when the TELE button 27T is depressed, and a wide-zoom switch SWWID which is turned ON when the WIDE button 27W is depressed, respectively. The CPU 31 carries out predetermined operations in response to the operation of the switches.

A DX code reading circuit 33 reads the DX code which represents the ISO speed of the DX code of a film cartridge. loaded in the camera body 11 and sends the same to the CPU 31. A zoom code input circuit 35 detects current focal length data of the zoom lens 13 through a zoom code plate (not shown) and sends the same to the CPU 31. Photometering sensor units 37 and 39 are provided with light receiving elements or photometering sensors (not shown) which receive object light incident through the photometering windows 15 and 17. Units 37 and 39 convert the same into electric current or voltage signals (photometric signals) corresponding to the object brightness and send the photometric signals to the CPU 31. The CPU 31 calculates the object brightness Bv based on the photometric signals and the focal length data supplied from the zoom code input circuit 35, and determines optimum shutter speed Tv and diaphragm value Av, based on the object brightness Bv and the ISO speed which is read through the DX code reading circuit 33.

A passive AF sensor unit 49, which functions also as a focus or object distance detection mechanism, receives the object light and outputs a pair of two-dimensional image signals, each including a plurality of image signals. The CPU 31 which receives the image signals stores the same for each unit image signal in an internal RAM. The CPU 31 carries out the object distance calculation (focusing operation) based on the pair of image signals stored in the internal RAM to determine the displacement of a focusing lens, so that the focusing lens can be moved by a shutter/diaphragm/focus drive circuit 41 to focus the lens on the object.

Furthermore the camera carries out the photometering and focusing operations when the photometering switch SWS is turned ON and drives the shutter/diaphragm/focus drive circuit 41 in accordance with the calculated displacement of the focusing lens, shutter speed TV and diaphragm value Av to thereby drive the focusing lens and the shutter/diaphragm when the release switch SWR is turned ON, respectively.

When the tele-zoom switch SWTEL or wide-zoom switch SWWID, associated with the zoom button 27 is turned ON, the CPU 31 drives the zoom motor M through a zoom motor drive 1s circuit 45 to move the zoom lens 13 (tele-zoom or wide-zoom). The zoom motor M drives the zoom lens 13 to a retracted position (innermost position) in which the zoom lens barrel is retracted in the camera body 11 when the power source is OFF and to a wide angle extremity when the power source is ON, respectively. The zoom lens 13 has a telephoto-extremity macro function, so that when a macro switch (not shown) is turned ON, the zoom motor M is driven to move the zoom lens 13 to a macro position beyond the telephoto extremity. The focal length of the zoom lens 13 and the lens position thereof, such as the macro position, are detected by the zoom code input circuit 35.

The photographing data of the camera is indicated via an indicator (not shown) within the finder and an LCD provided on the outer surface of the camera body 11 through a finder LCD indication circuit 47. A strobe device emits strobe light through the strobe circuit 43.

Figure 3:
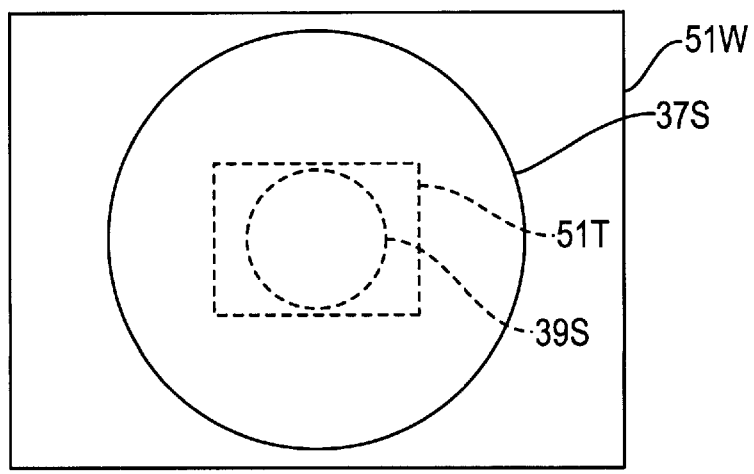
FIG. 3 is a schematic view of the photographing areas and the focusing areas of the camera shown in FIG. 1.

The photometric operation according to the present invention will be discussed below. FIG. 3 schematically shows a relationship between the photographing area and the photometering area of the photometering sensor units 37 and 39. In FIG. 3, the first photometering sensor unit 37 has a wide-angle photometering area 37S in which the average reading or center-weighed reading of a wide-angle photographing area (image surface) 51W formed when the zoom lens 13 is moved to the widest angle position (shortest focal length) is carried out. The second photometering sensor unit 39 has a telephoto photometering area 39S in which the average reading or center-weighed average reading of an area which is slightly smaller than a telephoto photographing area (image surface) 51T, formed when the zoom lens 13 is moved to the telephoto extremity (longest focal length) is carried out. The photometering areas 37S, 39S are formed to cover the center portions of the photographing areas 51W and 51T, so that the areas around the center portions of the photographing areas 51W and 51T can be measured, respectively. The telephoto photometering area 39S is contained in the wide-angle photometering area 37S. Namely, the object within the telephoto photometering area 39S can be detected not only by the second photometering sensor unit 39 but also by the first photometering sensor unit 37.

In the illustrated embodiment, the area ratio between the wide-angle photographing area 51W and the wide-angle photometering area (large photometering area) 37S is nearly identical to that of the area ratio between the telephoto photographing area 51T and the telephoto photometering area (center photometering area) 38S. Note that the wide-angle photometering area 37S can be made larger so as to cover the entirety of the wide-angle photographing area 51W. Also, the telephoto photometering area 39S can be made smaller to cover the center of the telephoto photographing area 51T (spot metering) only. The shape, size and surface area ratio of the photometering areas 37S and 39S are not limited to those in the illustrated embodiment. The present invention can be applied to a camera for a new camera system (e.g., our APS camera).

The following discussion will be addressed to the photometric operation system (algorithm), wherein the symbols used are defined as follows:

Bv represents an object brightness (reduced apex value) obtained by the calculation;

Bw represents a first (wide-angle) object brightness obtained using the photometric value of the first photometering sensor unit 37;

BN represents a second (telephoto) object brightness obtained using the photometric value of the second photometering sensor unit 39;

T represents a longest focal length (telephoto extremity) of the zoom lens;

W represents a shortest focal length (wide angle extremity) of the zoom lens;

fx represents a current focal length of the zoom lens.

<1st Embodiment>

The focal length of the zoom lens 13 is split into two sections corresponding to the wide angle area and the telephoto area. In the wide angle area, the exposure is controlled based on the first object brightness Bw only, and in the telephoto area the exposure is controlled based on the second object brightness BN only, repectively.

In the first embodiment, the object brightness Bv can be obtained over the entire focal length of the zoom lens 13 through a simple structure, in accordance with the photometric data distribution substantially identical to that in the average reading.

<2nd Embodiment>

The focal length of the zoom lens 13 is split into at least three sections or the object brightness Bv is calculated using the first object brightness Bw only, in the shortest focal length area, and the second object brightness BN is simply added to weight the first object brightness toward the longest focal length area.

In the second embodiment, the focal distance of the zoom lens 13 increases in respect to the shortest focal distance whereby the weight of second object brightness BN is increased according to the focal distance of the zoom lens 13. The calculation is performed using the first and second photometering mechanism. The weight for the second object brightness BN can be heavier than that for the first object brightness in the longest focal length area or the object brightness Bv can be calculated using the second object brightness only.

<3rd Embodiment>

The zoom range of the zoom lens 13 is split into three sections corresponding to the wide angle area, an intermediate area and the telephoto area. The object brightness Bv is calculated using the first object brightness Bw only, in the wide angle area; the object brightness Bv is weighed with the value identical to one-half of the first and second object brightnesses Bw and BN, in the intermediate area; and the object brightness Bw is calculated using the second object brightness BN only, in the telephoto area.

<4th Embodiment>

The fourth embodiment corresponds to a more concrete form of the second embodiment. In the fourth embodiment, the object brightness Bw or BN is weighed as follows.

$$Bv=K1\times(fx-W)/(T-W)\times BN+(1-K1\times(fx-W)/(T-W))\times Bw;$$

wherein

K1 represents a coefficient which satisfies 0<K1<1.

Figure 4:
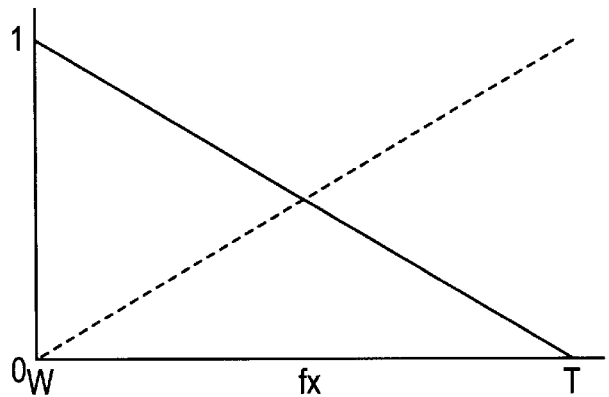
FIG. 4 is a graph showing a third embodiment of a relationship between weighting of the object brightness in large and small areas and the focal length.
Figure 5:
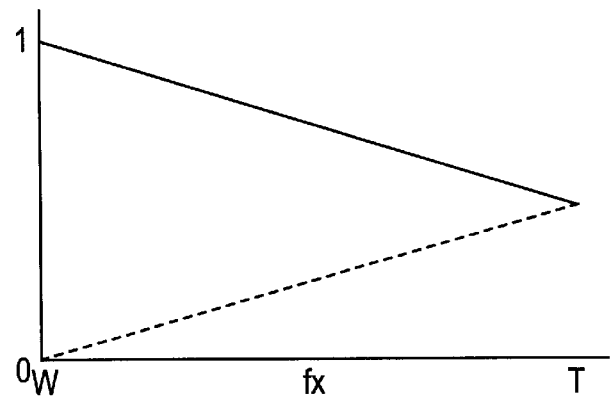
FIG. 5 is a graph showing a fourth embodiment of a relationship between the weighting of the object brightness in large and small areas and the focal length.

A near equivalent effect to that of the average reading can be obtained over the entire focal length range by calculating the object brightness Bv using the equation (1). The relationship between the weighting of the object brightness Bw or BN and the focal length is shown in FIGS. 4 and 5. In FIGS. 4 and 5, the ordinate represents the weight to be added, the abscissa represents the focal length, the solid line represents the weighed object brightness Bw, and the dotted line represents the weighed object brightness BN, respectively. The coefficient K1 is equal to 1 in FIG. 4 and to 0.5 in FIG. 5, respectively. If the K1 is decreased, the weight of the object brightness BN is reduced, so that the effect more equivalent to that obtained by the average reading can be obtained.

<5th Embodiment>

The fifth embodiment is a modification of the fourth embodiment. In the fifth embodiment, the object brightness Bw or BN is weighed as follows:

$$Bv=(1-K2\times(T-fx)/(T-W))\times BN+K2\times(T-fx)/(T-W)\times Bw;$$

wherein

K2 represents a coefficient which satisfies 0<K2≦1.

Figure 6:
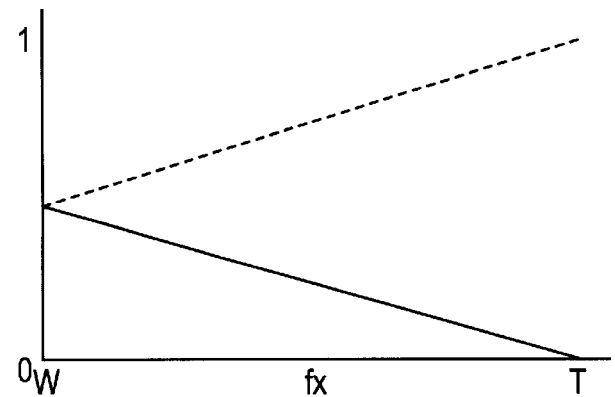
FIG. 6 is a graph showing a fifth embodiment of a relationship between the weighting of the object brightness in large and small areas and the focal length.

The relationship between the weighting of the object brightness Bw and BN and the focal length is shown in FIG. 6 where K2=0.5.

In equation (2), since the weight for the object brightness BN is heavy, a near identical effect to that obtained by the spot reading can be obtained. If the telephoto photometering area 39 is made smaller, the effect by the spot reading can be enhanced in the long focal length area. Moreover, if the coefficient K2 is decreased, the weight with the object brightness BN is increased, so that the effect of the center-weighed light reading or spot light reading can be enhanced.

In the aforementioned embodiments, the weight to be added varies linearly in proportion to the focal length. The following discussion will be directed to embodiments in which the weight varies along a multidimensional curve in accordance with the change in the focal length.

<6th Embodiment>

In the sixth embodiment, the object brightness Bv is weighed toward the longest focal length from the shortest focal length. The weight of the object brightness Bw is suddenly reduced in the long focal length area, and the weight of the object brightness BN is suddenly increased in the long focal length area.

$$Bv=K1\times((fx-W)/(T-W))^2\times BN+(1-K1\times((fx-W)/(T-W)^2)\times Bw;$$

wherein

K1 represents a coefficient which satisfies 0<K1≦1.

Figure 7:
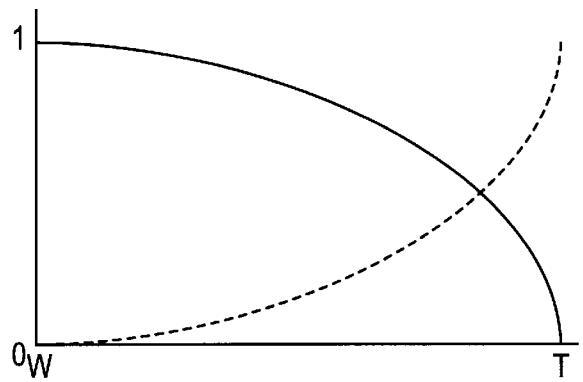
FIG. 7 is a graph showing a sixth embodiment of a relationship between the weighting of the object brightness in large and small areas and the focal length.

The relationship between the weighting of the object brightness Bw or BN and the focal length is shown in FIG. 7.

<7th Embodiment>

In the seventh embodiment, the object brightness Bv is weighed toward the longest focal length from the shortest focal length. The weight of the object brightness Bw is suddenly reduced in the short focal length area, and the weight of the object brightness BN is suddenly increased in the short focal length area.

$$Bv=K1\times((fx-W))/(T-W)^{1/2}\times BN+(1-K1\times((fx-W)/(T-W))^{1/2})\times Bw.$$

wherein

K1 represents a coefficient which satisfies $0<K1\leq 1$.

Figure 8:
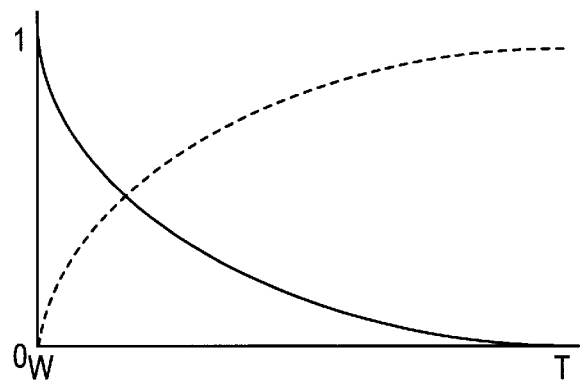
FIG. 8 is a graph showing a seventh embodiment of a relationship between the weighting of the object brightness in large and small areas and the focal length.

The relationship between the weighting of the object brightness Bw or BN and the focal length is shown in FIG. 8.

<8th Embodiment>

The focal length of the zoom lens 13 is split into two sections corresponding to a first area from the shortest focal length W to an intermediate focal length M, and a second area from the intermediate focal length M to the longest focal length T. In the first area from the shortest focal length W to the intermediate focal length M, the object brightness Bv is calculated by the following equation:

$$Bv=K1\times((fx-W)/(M-W))^2\times BN+(1-K1\times((fx-W)/(M-W))^2)\times Bw;$$

In the second area from the intermediate focal length M to the longest focal length T, the object brightness Bv is calculated by the following equation (6):

$$Bv=K2\times((fx-M)/(T-M))^{1/2}\times BN+(1-K2\times((fx-M)/(T-M))^{1/2})\times Bw.$$

Figure 9:
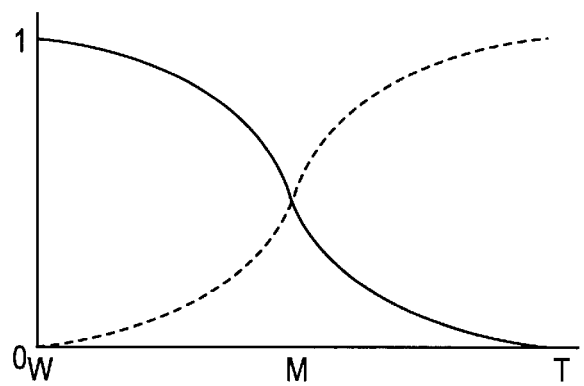
FIG. 9 is a graph showing an eighth embodiment of a relationship between the weighting of the object brightness in large and small areas and the focal length.

The relationship between the weighting of the object brightness Bw and BN and the focal length in equations (5) and (6) in shown in FIG. 9.

The sixth embodiment can be advantageously used particularly for scenic photography using a wide angle-zoom lens whose focal length is, for example, 20 to 50 mm.

The seventh embodiment can be advantageously used particularly for a portraiture using a telephoto zoom lens whose focal length is, for example, 40 to 120 mm.

The eighth embodiment can be advantageously applied to a zoom lens having a high zoom ratio from a wide angle position to a telephoto position (e.g., a focal length of 20 to 200 mm).

<9th Embodiment>

In the ninth embodiment, the focal length of the zoom lens 13 is split into three or more sections, so that the object brightness is weighed for each focal length section. Namely, the coefficient Kf in each of the expressions (1) through (6) is set. The ninth embodiment can be advantageously applied to a zoom lens in which the zooming is effected stepwise for the multi-split focal length sections. The value of the coefficient Kf varies in accordanc with the focal length of the sections.

In a modified embodiment, the variable focal length range of the zoom lens is divided into three sections, i.e., a wide-angle zone, an intermediate zone, and a telephoto zone, wherein the photometric calculation is carried out using only the first object brightness Bw of the wide-angle area. The first and second object brightness Bw and BN of the wide-angle area and the intermediate area in the intermediate area are equally weighed. The photometric calculation is carried out using only the second object brightness BN of the telephoto area.

As can be understood from the foregoing, according to the present invention, since in a photometric operation system of a camera comprising of a photographing lens whose focal length is variable, a plurality of photometering units for independently receiving and detecting rays of object light within a plurality of photometering areas of different sizes and a calculation mechanism for calculating the brightness of an object in accordance with the photometric data supplied from the photometering units, wherein a smaller photometering area is contained in a larger photometering area, the photometric data is weighed in accordance with the focal length of the photographing lens in the calculation of the object brightness by the photometering units, a photometering calculation can be carried out in accordance with the change in the focal length using two photometering units or an appropriate photometric data distribution can be selected depending on the focal length.

What is claimed is:

1. A photometric operation system of a camera comprising:

a photographing lens having a variable focal length;

a plurality of photometering systems which independently receive and detect rays of object light within a plurality of photometering areas of different sizes; and a calculation device which calculates a brightness of an object in accordance with photometric data supplied from said each of said plurality of photometering systems;

wherein photometric data of a smaller photometering area is included in photometric data of a larger photometering area, and wherein said photometric data is weighed in accordance with said focal length of said photographing lens during calculation of said brightness.

2. A photometric operation system of a camera comprising:

a photographing lens having a variable focal length;

a first photometering system which measures light data of a first object area;

a second photometering system which measures light data of a second smaller object area included in said first object area, said light data of said first object area including said light data of said second object area; and a calculation system which calculates one of a brightness and an exposure value in accordance with photometric data supplied from said each of said first and second photometering systems;

wherein said calculation system uses a predetermined relationship in which first and second photometric data of said first and second photometering systems are weighed in accordance with said focal length of said photographing lens.

3. A photometric operation system according to claim 2, wherein a center of each photometering area is nearly identical to a center of a photographing area.

4. A photometric operation system according to claim 2, wherein a surface area ratio between a photographing area at said shortest focal length of said photographing lens and said first object area is nearly identical to a surface area ratio between said photographing area at said longest focal length of said photographing lens and said second object area.

5. A photometric operation system according to claim 2, wherein said photographing lens is one of a two focal length lens and a zoom lens, and wherein said focal length is split into a short focal length section and a long focal length section, so that said calculation system uses said photometric data of said first photometering system only in said short focal length section and uses said photometric data of said second photometering system only in said long focal length section.

6. A photometric operation system according to claim 2, wherein said photographing lens is a zoom lens, so that said photometering area of said first photometering system corresponds to a photographing area of said zoom lens at a shortest focal length, and said photometering area of said second photometering system corresponds to said photographing area of said zoom lens at a longest focal length, and wherein said calculation system uses only first photometric data of said first photometering system at said shortest focal length of said zoom lens, and as the focal length of said zoom lens increases with respect to said shortest focal length, ad said weight of second photometering data of said second photometering system is increased according to the focal length of said zoom lens, and said calculation system uses said first and second photometering systems.

7. A photometric operation system according to claim 6, wherein said calculation system performs said calculation using only second photometric data of said second photometering system at said longest focal length of said zoom lens.

8. A photometric operation system according to claim 2, wherein said photographing lens is a zoom lens, and wherein said variable focal length range of said zoom lens is divided into three ranges: a wide-angle area, an intermediate area and a telephoto area, so that said calculation system performs said calculation using only said photometric data of said first photometering system in said wide-angle area, said photometric data of said first and second photometering systems are weighed equally in said intermediate area, and only said photometric data of said second photometering system in said telephoto area, respectively.

9. A photometric operation system of a camera comprising:
   a photographing having a variable focal length;
   a first photometering system which measures light data of a first object area;
   a second photometering system which measures light data of a second smaller object area included in said first object area; and
   a calculation system which calculates one of brightness and an exposure value in accordance with photometric data supplied from said first and second photometering systems;
   wherein said calculation system uses a predetermined relationship in which first and second photometric data of said first and second photometering systems are weighed in accordance with said focal length of said photographing lens,
   wherein said calculation system calculates said object brightness Bv using the following equation:

$$BV=K1\times(fx-W)/(T-W)\times BN+(1-K1\times(fx-W)/(T-W))\times Bw$$

wherein
   Bv represents an object brightness obtained by said calculation; system
   K1 represents a coefficient which satisfies $0<K1\leq 1$;
   Bw represents an object brightness obtained using said photometric value of said first photometering system;
   BN represents an object brightness obtained using said photometric value of said second photometering system;
   T represents a focal length at a telephoto extremity;
   W represents a focal length at a wide angle extremity; and
   fx represents a current focal length.

10. A photometric operation system of a camera comprising:
   a photographing lens having a variable focal length;
   a first photometering system which measures light data of a first object area;
   a second photometering system which measures light data of a second smaller object area included in said first object area; and
   a calculation system which calculates one of a brightness and an exposure value in accordance with photometric data supplied from said first and second photometering systems;
   wherein said calculation system uses a predetermined relationship in which first and second photometric data of said first and second photometering systems are weighed in accordance with said focal length of said photographing lens,
   wherein said calculation system calculates said object brightness Bv using the following equation:

$$Bv=(1-K2\times(T-fx)/(T-W))\times BN+K2\times(T-fx)/(T-W)\times Bw$$

wherein
   Bv represents an object brightness obtained by said calculation system;
   K2 represents a coefficient which satisfies $0<K2\leq 1$;
   Bw represents an object brightness obtained using said photometric value of said first photometering system;
   BN represents an object brightness obtained using said photometric value of said second photometering system;
   T represents a focal length at a telephoto extremity;
   W represents a focal length at a wide angle extremity; and
   fx represents a current focal length.

11. A photometric operation system of a camera comprising:
   a photographing lens having a variable focal length;
   a first photometering system which measures light data of a first object area;
   a second photometering system which measures light data of a second smaller object area included in said first object area; and
   a calculation system which calculates one of a brightness and an exposure value in accordance with photometric data supplied from said first and second photometering systems;
   wherein said calculation system uses a predetermined relationship in which first and second photometric data of said first and second photometering systems are weighed in accordance with said focal length of said photographing lens,
   wherein said calculation system calculates said object brightness Bv using the following equation:

$$Bv=K1\times((fx-W)/(T-W))^2\times BN+(1-K1\times((fx-W)/(T-W))^2)\times Bw$$

wherein
   Bv represents an object brightness obtained by said calculation system;
   K1 represents a coefficient which satisfies $0<K1\leq 1$;
   Bw represents an object brightness obtained using said photometric value of said first photometering system;
   BN represents an object brightness obtained using said photometric value of said second photometering system;
   T represents a focal length at a telephoto extremity;
   W represents a focal length at a wide angle extremity; and
   fx represents a current focal length.

12. A photometric operation system of a camera comprising:
- a photographing lens having a variable focal length;
- a first photometering system which measures light data of a first object area;
- a second photometering system which measures light data of a second smaller object area included in said first object area; and
- a calculation system which calculates one of a brightness and an exposure value in accordance with photometric data supplied from said first and second photometering systems;
- wherein said calculation system uses a predetermined relationship in which first and second photometric data of said first and second photometering systems are weighed in accordance with said focal length of said photographing lens,
- wherein said calculation calculates said object brightness Bv using the following equation:

$$Bv=K1\times((fx-W)/(T-W))^{1/2}\times BN+(1-K1\times((fx-W)/(T-W))^{1/2})\times Bw$$

wherein
- Bv represents an object brightness obtained by said calculation system;
- K1 represents a coefficient which satisfies $0<K1\leq 1$;
- Bw represents an object brightness obtained using said photometric value of said first photometering system;
- BN represents an object brightness obtained using said photometric value of said second photometering system;
- T represents a longest focal length;
- W represents a shortest focal length; and
- fx represents a current focal length.

13. A photometric operation system of a camera comprising:
- a photographing lens having a variable focal length;
- a first photometering system which measures light data of a first object area;
- a second photometering system which measures light data of a second smaller object area included in said first object area; and
- a calculation system which calculates one of a brightness and an exposure value in accordance with photometric data supplied from said first and second photometering systems;
- wherein said calculation system uses a predetermined relationship in which first and second photometric data of said first and second photometering systems are weighed in accordance with said focal length of said photographing lens,
- wherein said calculation system calculates said object brightness Bv using the following equations in an area from a shortest focal length W to an intermediate focal length M and in an area from said intermediate focal length M to a longest focal length T, respectively:

$$Bv=K1\times((fx-W)/(M-W))^2\times BN+(1-K1\times((fx-W)/(M-W))^2)\times Bw$$

$$Bv=K2\times((fx-M)/(T-M))^{1/2}\times BN+(1-K2\times((fx-M)/(T-M))^{1/2})\times Bw$$

wherein
- Bv represents an object brightness obtained by said calculation system;
- K1 represents a first coefficient which satisfies $0<K1\leq 1$;
- K2 represents a second coefficient which satisfies $0<K2\leq 1$;
- Bw represents an object brightness obtained using said photometric value of said first photometering system;
- BN represents an object brightness obtained using said photometric value of said second photometering system;
- T represents a focal length at a telephoto extremity;
- W represents a focal length at a wide angle extremity; and
- fx represents a current focal length.

14. A photometric operation system according to claim 2, wherein said photographing lens is a zoom lens in which said variable focal length is split into multiple focal length sections, so that said zooming is carried out stepwise for said multiple focal length sections, and wherein said calculation system performs said calculation to determine said object brightness in which said first and second photometric data of said first and second photometering system are weighed appropriately in accordance with said focal length for each focal length section.

* * * * *